(12) United States Patent
Jiang et al.

(10) Patent No.: US 11,509,495 B2
(45) Date of Patent: *Nov. 22, 2022

(54) BROADCAST AND MULTICAST IN A WIRELESS COMMUNICATION SYSTEM IN A WIRELESS COMMUNICATION NETWORK

(71) Applicant: NXP USA, Inc., Austin, TX (US)

(72) Inventors: Jinjing Jiang, San Jose, CA (US); Liwen Chu, San Ramon, CA (US); Lei Wang, San Diego, CA (US); Yakun Sun, San Jose, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 222 days.

This patent is subject to a terminal disclaimer.

(21) Appl. No.: 16/806,384

(22) Filed: Mar. 2, 2020

(65) Prior Publication Data
US 2020/0204386 A1 Jun. 25, 2020

Related U.S. Application Data

(63) Continuation of application No. 15/418,420, filed on Jan. 27, 2017, now Pat. No. 10,581,627.
(Continued)

(51) Int. Cl.
*H04L 12/18* (2006.01)
*H04L 43/10* (2022.01)
(Continued)

(52) U.S. Cl.
CPC .............. *H04L 12/189* (2013.01); *H04B 7/14* (2013.01); *H04L 43/10* (2013.01);
(Continued)

(58) Field of Classification Search
USPC ......................................................... 370/312
See application file for complete search history.

(56) References Cited

U.S. PATENT DOCUMENTS

| 2011/0002219 A1* | 1/2011 | Kim | ..................... | H04B 7/0452 370/203 |
| 2011/0261708 A1* | 10/2011 | Grandhi | ............... | H04B 7/0452 370/252 |

(Continued)

*Primary Examiner* — Alpus Hsu
*Assistant Examiner* — Hooman Houshmand

(57) ABSTRACT

The present disclosure includes systems and techniques relating to broadcast and multicast in a wireless communication system. In some implementations, an announcement frame indicating a broadcast or multicast service period to multiple second wireless devices is transmitted by a first wireless device. The announcement frame indicates (i) an end time of the broadcast or multicast service period and (ii) an order of a sequence of frames to be directed to the multiple second wireless devices. Each of the sequence of frames is transmitted at the first wireless device using a directional antenna pattern to a respective one of the multiple second wireless devices, according to the order of the sequence of frames indicated in the announcement frame. An acknowledgement frame in response to the each of the sequence of frames is received at the first wireless device from the respective one of the multiple second wireless devices.

19 Claims, 10 Drawing Sheets

Related U.S. Application Data

(60) Provisional application No. 62/290,194, filed on Feb. 2, 2016.

(51) Int. Cl.
*H04W 72/00* (2009.01)
*H04B 7/14* (2006.01)
*H04W 84/12* (2009.01)
*H04W 88/08* (2009.01)

(52) U.S. Cl.
CPC .......... *H04W 72/005* (2013.01); *H04W 84/12* (2013.01); *H04W 88/08* (2013.01)

(56) References Cited

U.S. PATENT DOCUMENTS

| | | | |
|---|---|---|---|
| 2013/0286959 A1* | 10/2013 | Lou | H04L 5/003 370/329 |
| 2016/0255606 A1* | 9/2016 | Chu | H04L 5/0057 370/312 |
| 2016/0380685 A1* | 12/2016 | Kash | H04W 8/22 370/329 |
| 2017/0353923 A1* | 12/2017 | Trainin | H04L 5/0051 |
| 2018/0206139 A1* | 7/2018 | Wang | H04B 7/15507 |

\* cited by examiner

BROADCAST AND MULTICAST IN A WIRELESS COMMUNICATION SYSTEM IN A WIRELESS COMMUNICATION NETWORK

CROSS REFERENCE TO RELATED APPLICATIONS

This application is a continuation of co-pending, U.S. patent application Ser. No. 15/418,420, filed on Jan. 27, 2017, which claims the benefit of U.S. Provisional Patent Application No. 62/290,194, filed on Feb. 2, 2016, entitled "Efficient Broadcast and Multicast in 11ay," the disclosure of which is hereby expressly incorporated herein, by reference, in its entirety.

BACKGROUND

The present disclosure describes systems and techniques relating, generally, to communication networks and, more particularly, to wireless local area networks (WLANs).

WLANs (e.g., WiFi networks) have evolved rapidly over the past decade. For example, the Institute for Electrical and Electronics Engineers (IEEE) has developed a family of standards, the 802.11 family of standards for WLAN, including 802.11a, 802.11b, 802.11g, 802.11n, 802.11ac, 802.11ax, etc. The 802.11 family of standards have evolved to provide improved data throughput and reliability for WLAN communications.

Among them, IEEE 802.11ad (Very High Throughput 60 GHz) is a WLAN technique that operates in the globally unlicensed 60 GHz band, e.g., 57-66 GHz. IEEE 802.11ay (Enhancements for Ultra High Throughput in and around the 60 GHz Band) is currently being developed as a next generation 60 GHz WLANs (NG60) extension to IEEE 802.11ad, with a goal of achieving extended throughput and range.

SUMMARY

The present disclosure includes systems and techniques relating to broadcast and multicast in a wireless communication system. According to an aspect of the described systems and techniques, a method includes transmitting, at a first wireless communication device, an announcement frame indicating a broadcast or multicast service period to a number of second wireless communication devices, wherein the announcement frame indicates (i) an end time of the broadcast or multicast service period and (ii) an order of a sequence of frames to be directed to the number of second wireless communication devices, each of the sequence of frames to be directed to a respective one of the number of second wireless communication devices; transmitting, at the first wireless communication device using a directional antenna pattern, the each of the sequence of frames to the respective one of the number of second wireless communication devices, according to the order of the sequence of frames indicated in the announcement frame; and receiving, at the first wireless communication device from the respective one of the number of second wireless communication devices, an acknowledgement frame in response to the each of the sequence of frames.

In some implementations, transmitting the announcement frame includes transmitting the announcement frame using a quasi-omni-directional antenna pattern.

In some implementations, transmitting the announcement frame includes transmitting the announcement frame that is aggregated with data frames to the number of second wireless communication devices before a start of the broadcast or multicast service period.

In some implementations, the announcement frame further indicates an end time of a last frame in the sequence of frames within the broadcast or multicast service period.

In some implementations, receiving an acknowledgement frame in response to the each of the sequence of frames includes receiving the acknowledgement frame in response to the each of the sequence of frames, after transmitting all of the sequence of frames to be directed to the number of second wireless communication devices.

In some implementations, the acknowledgement frame in response to the each of the sequence of frames is one of a sequence of acknowledgement frames from the number of second wireless communication devices; and wherein receiving an acknowledgement frame in response to the each of the sequence of frames includes receiving the sequence of acknowledgement frames from the number of second wireless communication devices, according to the order of the sequence of frames indicated in the announcement frame.

In some implementations, the acknowledgement frame in response to the each of the sequence of frames is one of a sequence of acknowledgement frames from the number of second wireless communication devices; and the method further including transmitting a polling frame to trigger transmission of the sequence of acknowledgement frames from the number of second wireless communication devices, according to the order of the sequence of frames indicated in the announcement frame.

In some implementations, two adjacent frames in the sequence of frames are separated by an inter-frame spacing time interval that is shorter than a short inter-frame space (SIFS).

In some implementations, at least each of the number of second wireless communication devices serves as a relay between the first wireless communication device and at least one third wireless communication device, the method further including transmitting, by the at least one of the number of second wireless communication devices, the frame to be directed to the at least one third wireless communication device, after a last acknowledgement frame has been transmitted, according to the order of the sequence of frames indicated in the announcement frame.

In some implementations, at least each of the number of second wireless communication devices serves as a relay between the first wireless communication device and at least one third wireless communication device, the method further including transmitting, by the at least one of the number of second wireless communication devices using spatial reuse, the frame to be directed to the at least one third wireless communication device, simultaneously with transmitting, by the first wireless communication device, one of the sequence of frames to a respective one of the number of second wireless communication devices.

In some implementations, the method further includes obtaining, at the first wireless communication device, a connectivity map for broadcast and multicast to the number of second wireless communication devices before the broadcast and multicast service period, based on beamforming training information received from the number of second wireless communication devices; and transmitting, at the first wireless communication device, an extended schedule element in a management frame that notifies the number of second wireless communication devices the broadcast or multicast service period.

According to another aspect of the described systems and techniques, a device includes a transceiver; processor electronics coupled with the transceiver; and a non-transitory computer-readable storage medium coupled to the processor electronics and storing programming instructions for execution by the processor electronics. The programming instructions instruct the processor electronics to operate the transceiver to receive, from a first wireless communication device, an announcement frame indicating a broadcast or multicast service period to a number of second wireless communication devices, the device being one of the number of second wireless communication devices, wherein the announcement frame indicates (i) an end time of the broadcast or multicast service period, (ii) an end time of a last frame in a sequence of frames within the broadcast or multicast service period, and (iii) an order of the sequence of frames to be directed to the number of second wireless communication devices, each of the sequence of frames to be directed to a respective one of the number of second wireless communication devices; receive, from the first wireless communication device, a frame to be directed to the device, according to the order of the sequence of frames indicated in the announcement frame; and transmit, to the first wireless communication device, an acknowledgement frame in response to receiving the frame to be directed to the device, according to the order of the sequence of frames indicated in the announcement frame.

In some implementations, the programming instructions instruct the processor electronics to operate the transceiver to decode, from the announcement frame, an end time of a last frame in the sequence of frames within the broadcast or multicast service period; and transmit, to the first wireless communication device, the acknowledgement frame in response to receiving the frame to be directed to the device according to the order of the sequence of frames indicated in the announcement frame after the end time of the last frame in the sequence of frames within the broadcast or multicast service period.

In some implementations, the programming instructions instruct the processor electronics to operate the transceiver to receive a polling frame for triggering transmission of a sequence of acknowledgement frames from the number of second wireless communication devices according to the order of the sequence of frames indicated in the announcement frame; and transmit, to the first wireless communication device, the acknowledgement frame in response to receiving the frame to be directed to the device, according to the order of the sequence of frames indicated in the announcement frame after receiving the polling frame.

In some implementations, the device serves as a relay between the first wireless communication device and at least one third wireless communication device, and the programming instructions instruct the processor electronics to operate the transceiver to relay a frame to be directed to the at least one third wireless communication device.

In some implementations, the programming instructions instruct the processor electronics to operate the transceiver to transmit the frame to be directed to the at least one third wireless communication device, after a last acknowledgement frame has been transmitted, according to the order of the sequence of frames indicated in the announcement frame.

In some implementations, the programming instructions instruct the processor electronics to operate the transceiver to transmit, using spatial reuse, the frame to be directed to the at least one third wireless communication device, simultaneously with the first wireless communication device's transmission of one of the sequence of frames to a respective one of the number of second wireless communication devices.

According to another aspect of the described systems and techniques, a device includes a transceiver; processor electronics coupled with the transceiver; and a non-transitory computer-readable storage medium coupled to the processor electronics and storing programming instructions for execution by the processor electronics. The programming instructions instruct the processor electronics to operate the transceiver to transmit an announcement frame indicating a broadcast or multicast service period to a number of second wireless communication devices, wherein the announcement frame indicates (i) an end time of the broadcast or multicast service period and (ii) an order of a sequence of frames to be directed to the number of second wireless communication devices, each of the sequence of frames to be directed to a respective one of the number of second wireless communication devices; transmit, using a directional antenna pattern, the each of the sequence of frames to the respective one of the number of second wireless communication devices, according to the order of the sequence of frames indicated in the announcement frame; and receive, from the respective one of the number of second wireless communication devices, an acknowledgement frame in response to the each of the sequence of frames.

In some implementations, the announcement frame further indicates an end time of a last frame in the sequence of frames within the broadcast or multicast service period.

In some implementations, the programming instructions instruct the processor electronics to operate the transceiver to obtain a connectivity map for broadcast and multicast to the number of second wireless communication devices before the broadcast and multicast service period, based on beamforming training information received from the number of second wireless communication devices; and transmit an extended schedule element in a management frame that notifies the number of second wireless communication devices the broadcast or multicast service period.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed implementation(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The disclosed technologies can result in one or more of the following potential advantages. The described systems and techniques can serve as an efficient multicast/broadcast scheme, for example, in a Video/Mass-Data Distribution/Video on Demand System under IEEE 802.11ay or other standards. The described systems and techniques can achieve relatively high spectrum efficiency, data rate and low latency.

Details of one or more implementations are set forth in the accompanying drawings and the description below. Other features and advantages may be apparent from the description and drawings, and from the claims.

DRAWING DESCRIPTIONS

DETAILED DESCRIPTION

The systems and techniques described herein can be implemented as one or more devices, such as one or more integrated circuit (IC) devices, in a communication device (e.g., a wireless communication device, a wireline communication device, an electronic data storage device, a channel medium access access/control device). For example, the systems and techniques disclosed can be implemented in a wireless local area network (WLAN) transceiver device (e.g., a WLAN chipset) suitable for use in an orthogonal frequency division multiplexing (OFDM) multiple input multiple output (MIMO) system.

A WLAN typically includes an access point (AP) and multiple client stations (STAs). The multiple client stations can communicate with the AP over a shared communication medium (e.g., wireless channel such as a radio frequency (RF) channel). A WLAN can operate in a unicast mode, a multicast mode, or a broadcast mode. In the unicast mode, the AP transmits information to one client station at a time. In the multicast mode, the same information is concurrently transmitted to a group of client stations. In the broadcast mode, the same information is concurrently transmitted to all the client stations associated with the AP. The following discussion mainly uses broadcast as an example; however, the described techniques can be easily applied to multicast, without departing from the scope of this disclosure.

In some implementations, the techniques described in this disclosure can serve as an efficient multicast/broadcast scheme, for example, for simultaneous transmission to multiple devices in a wireless communication network. The described techniques can achieve high network throughput and relatively low latency. For example, the described techniques can reduce the overhead of sequential transmission (e.g., used by single carrier (SC/orthogonal frequency-division multiple (OFDM) physical layer (PHY)) that implicates multiple SIFS, backoff, etc.) The described techniques can be used in applications that require high throughput (e.g., Video/Mass-Data Distribution/Video on Demand System under IEEE 802.11ay).

Figure 1:
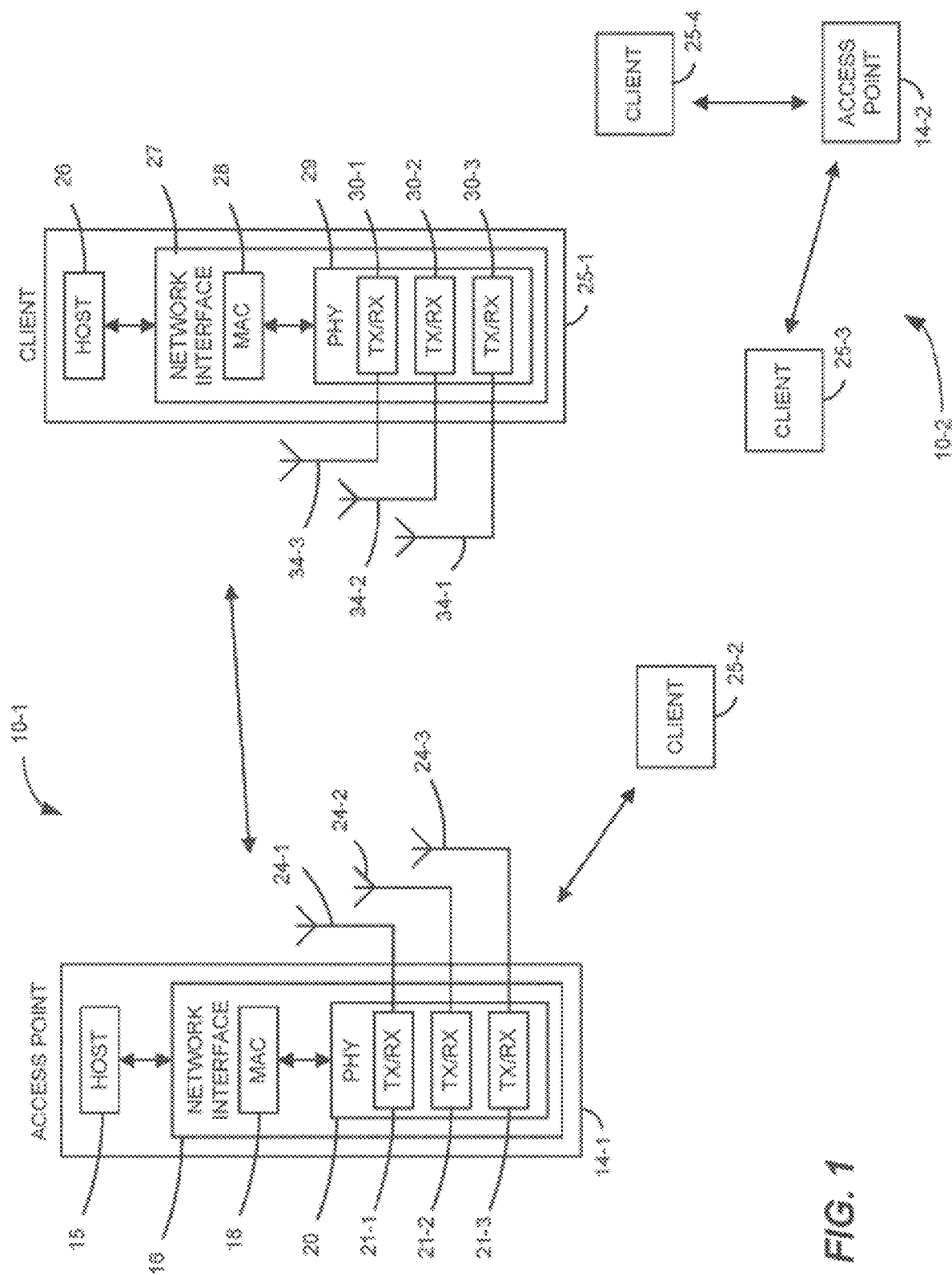
FIG. 1 is a block diagram of examples of wireless local area networks (WLANs), according to some implementations.

FIG. 1 is a block diagram of examples of wireless local area networks (WLANs) 10-1 and 10-2, according to some implementations. Although two WLANs are illustrated in FIG. 1 for exemplary purposes, other numbers (e.g., 1, 3, 4, 5, 6, etc.) of WLANs are present in other implementations.

Each WLAN 10 includes one or more APs (e.g., AP 14-1 and 14-2 (collectively, APs 14)). Each WLAN 10 includes a number of client stations (also referred to as STAs) 25-1, 25-2, 25-3 and 25-4 (collectively, client stations 25). Although two client stations 25 in each of the WLANs 10 are illustrated in FIG. 1, each of the WLANs 10 includes different numbers (e.g., 1, 2, 3, 5, 6, etc.) of client stations 25 in various scenarios and implementations.

In some implementations, the AP 14 can serve as a coordinating station, such as, a personal basic service set (PBSS) control point (PCP). The following discussion mainly uses the AP 14 as the coordinator or central station of a broadcast or multicast process. In some implementations, another device (e.g., a client station 25) may also serve as the coordinator or central station (e.g., in an ad hoc or device-to-device communication network) for performing broadcast or multicast.

In some implementations, the AP 14 can broadcast or multicast to multiple STAs 25, for example, by transmitting data frames in a data transmission interval (DTI) to the multiple STAs 25. The AP 14 can notify and coordinate the multiple STAs 25 about a broadcast or multicast process (e.g., a broadcast or multicast service period (SP)) by sending a broadcast or multicast announcement. The broadcast or multicast announcement includes necessity information, for example, a duration of the broadcast or multicast SP, an order of sequential frames to be transmitted to the multiple STAs, an end time of the last data frame to the multiple STAs, etc. The broadcast or multicast announcement facilitates an orderly, efficient implementation of the broadcast or multicast process.

The configuration of the AP 14 may vary among different implementations, but a typical configuration will now be described, using the AP 14-1 as an example. The AP 14-1 includes a host processor 15 coupled to a network interface 16. In some implementations, the network interface 16 includes one or more integrated circuits (ICs) configured to operate as discussed below. The network interface 16 includes a medium access control (MAC) processor 18 and a physical layer (PHY) processor 20. The PHY processor 20 includes a number of transceivers 21-1, 21-2 and 21-3 (collectively, transceivers 21), and the transceivers 21 are coupled to a number of antennas 24-1, 24-2, and 24-3 (collectively, antennas 24).

Although three transceivers 21 and three antennas 24 are illustrated in FIG. 1, the AP 14-1 includes other suitable numbers (e.g., 1, 2, 4, 5, etc.) of transceivers 21 and antennas 24, in other implementations. In some implementations, the AP 14-1 includes a higher number of antennas 24 than transceivers 21, and antenna switching techniques are utilized. In some implementations, the MAC processor 18 is implemented on at least a first IC, and the PHY processor 20 is implemented on at least a second IC. In some implementations, at least a portion of the MAC processor 18 and at least a portion of the PHY processor 20 are implemented on a single IC. In some implementations, the MAC processor 18 and the PHY processor 20 are configured to operate according to a communication protocol (e.g., an IEEE 802.11ad or IEEE 802.11ay communication protocol).

In some implementations, the AP 14-1 can choose a quasi-omni antenna pattern or a directional antenna pattern for transmitting control and data frames to the multiple STAs 25. For example, the AP 14-1 may use a quasi-omni antenna pattern to transmit control signaling (e.g., the broadcast/multicast announcement), while using a directional antenna pattern to transmit data frames to STAs 25.

A directional antenna pattern or beamforming antenna pattern is an antenna pattern that radiates or receives greater power over a narrow beam in one or more specific directions, allowing for increased performance and reduced interference from unwanted sources. In some implementations, the directional antenna pattern can achieve high data rate. Therefore, in some implementations, the directional antenna pattern is used by the AP 14 or the STA 25 by transmitting MAC payload over narrow beams to achieve high data rate.

By contrast, an omni-directional antenna pattern radiates radio wave power uniformly in all directions in one plane. But a truly omni-directional mm-Wave antenna patterns is not practical for example, over high Wi-Fi frequencies such as 60 GHz. A quasi-omni-directional antenna pattern that allows gain fluctuations over the pattern is used, for example, in IEEE 802.11ad and IEEE 802.11ay. In some implementations, the quasi-omni-directional antenna pattern is used by the AP 14 or another broadcasting or multicast station to transmit information scheduled or destined to multiple STAs 25 to save signaling overhead and improve efficiency.

In some implementations, spatial reuse and downlink (DL) multi-user (MU) multiple-input-multiple-output (MIMO) can be used by the AP 14 for broadcast/multicast to further save the airtime overhead among multiple STAs 25.

The configuration of the client station 25 may vary among different implementations, but a typical configuration will now be described, using the client station 25-1 as an example. The client station 25-1 includes a host processor 26 coupled to a network interface 27. In some implementations, the network interface 27 includes one or more ICs configured to operate as discussed below. The network interface 27 includes a MAC processor 28 and a PHY processor 29. The PHY processor 29 includes a number of transceivers 30-1, 30-2, and 30-3 (collectively, transceivers 30), and the transceivers 30 are coupled to a number of antennas 34-1, 34-2, and 34-3 (collectively, antennas 34). Although three transceivers 30 and three antennas 34 are illustrated in FIG. 1, the client station 25-1 includes other suitable numbers (e.g., 1, 2, 4, 5, etc.) of transceivers 30 and antennas 34, in other implementations. In some implementations, the client station 25-1 includes a higher number of antennas 34 than transceivers 30, and antenna switching techniques are utilized. In some implementations, the MAC processor 28 is implemented on at least a first IC, and the PHY processor 29 is implemented on at least a second IC. In some implementations, at least a portion of the MAC processor 28 and at least a portion of the PHY processor 29 are implemented on a single IC.

In some implementations, one or more of the other client stations of the WLANs 10 have a structure that is the same as, or similar to, the client station 25-1. In these implementations, the client stations 25, structured like the client station 25-1, have the same or a different number of transceivers and antennas. For example, the client station 25-2 has only two transceivers and two antennas (not shown), according to some implementations. These same variations may be present in the client stations 25 of the second WLAN 10-2.

In some implementations, the MAC processor 18 and the PHY processor 20 of the AP 14-1 are configured to generate data units conforming to the communication protocol and having formats described herein. In some implementations, the MAC processor 18 is configured to implement MAC layer functions, including MAC layer functions of the communication protocol. In some implementations, the PHY processor 20 is configured to implement PHY functions, including PHY functions of the communication protocol. For example, in some implementations, the MAC processor 18 is configured to generate MAC layer data units such as MPDUs, MAC control frames, etc., and provide the MAC layer data units to the PHY processor 20. In some implementations, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in some implementations, the PHY processor 20 is configured to receive PHY data units that were received via the antennas 24, and extract MAC layer data units encapsulated within the PHY data units. In some implementations, the PHY processor 20 provides the extracted MAC layer data units to the MAC processor 18, which processes the MAC layer data units. In some implementations, the AP 14-1 is operating in a broadcast or multicast mode and the MAC processor 18 and the PHY processor 20 of the AP 14-1 are configured to generate data units including an extended schedule element for announcing one or more broadcast or multicast service periods, for example, according to an example of the extended schedule element format described in FIG. 3.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the communication protocol and having formats described hereinafter, and to determine that such data units conform to the communication protocol, according to various implementations.

In some implementations, the MAC processor 28 and the PHY processor 29 of the client device 25-1 are configured to generate data units conforming to the communication protocol and having formats described herein. In some implementations, the MAC processor 28 is configured to implement MAC layer functions, including MAC layer functions of the communication protocol. In some implementations, the PHY processor 29 is configured to implement PHY functions, including PHY functions of the communication protocol. For example, in some implementations, the MAC processor 28 is configured to generate MAC layer data units such as MPDUs, MAC control frames, etc., and provide the MAC layer data units to the PHY processor 29. In some implementations, the PHY processor 29 is configured to receive MAC layer data units from the MAC processor 28 and encapsulate the MAC layer data units to generate PHY data units such as PPDUs for transmission via the antennas 34. Similarly, in some implementations, the PHY processor 29 is configured to receive PHY data units that were received via the antennas 34, and extract MAC layer data units encapsulated within the PHY data units. In some implementations, the PHY processor 29 provides the extracted MAC layer data units to the MAC processor 28, which processes the MAC layer data units. In some implementations, the MAC processor 28 and the PHY processor 29 are configured to receive and extract data units that includes an extended schedule element for announcing one or more broadcast or multicast service periods, for example, according to an example of the extended schedule element format described in FIG. 3.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the communication protocol and having formats described hereinafter, and to determine that such data units conform to the communication protocol, according to various implementations.

Figure 2:
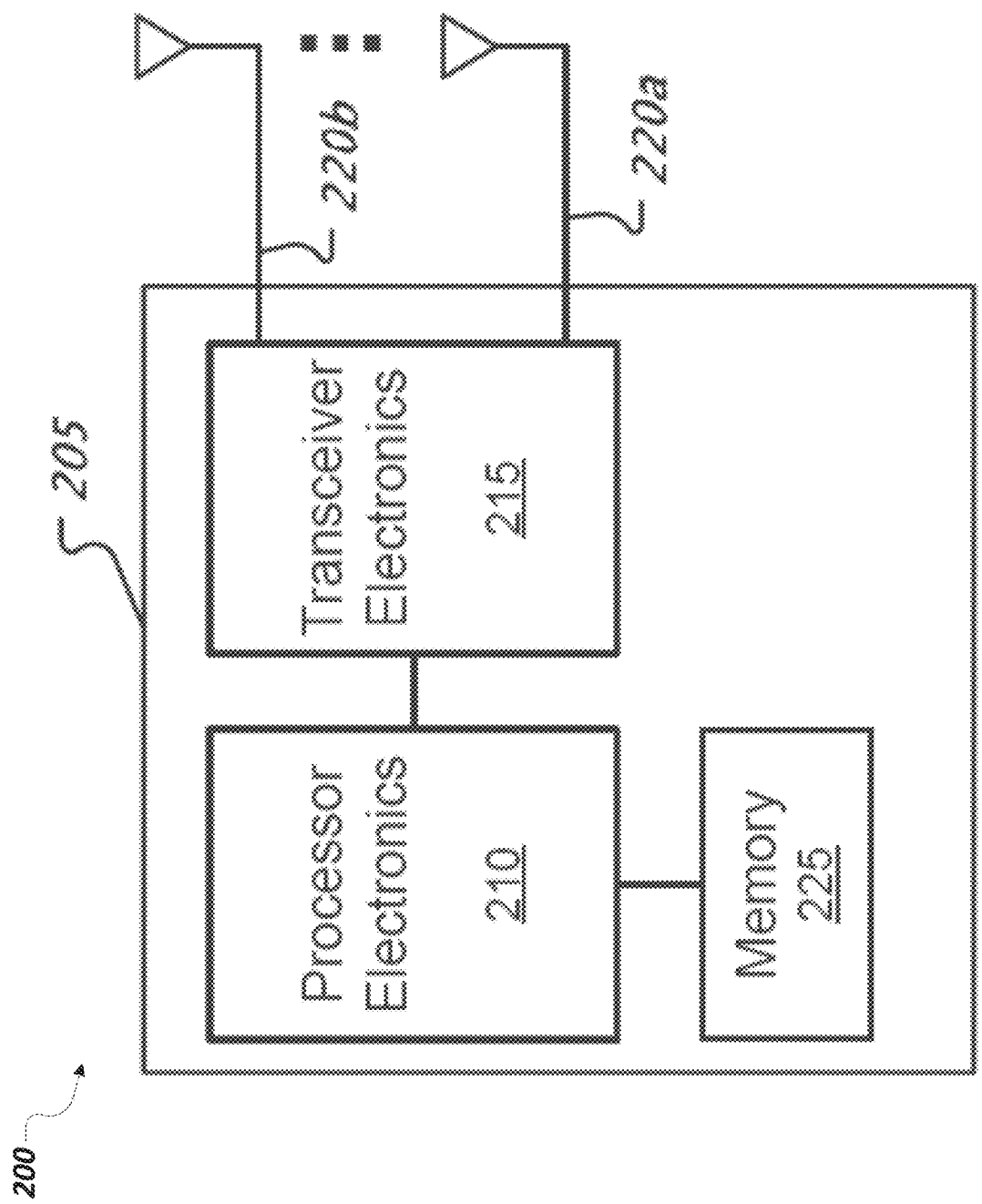
FIG. 2 shows a block diagram of an example of a wireless communication device, according to some implementations.

FIG. 2 shows a block diagram 200 of an example of a wireless communication device 205. Various examples of device 205 include an access point (AP), a base station (BS), an access terminal (AT), a client station, or a mobile station (MS). For example, the device 205 can represent one or more of the AP 14 or client stations 25 in FIG. 1, or another device.

The device 205 can include processor electronics 210 such as one or more processors that implement methods effecting the techniques presented in this disclosure. The processor electronics 210 can be operable to execute computer-readable instructions that, when executed on the processor electronics 210, cause the device 205 to implement methods effecting the techniques presented in this disclosure. For example, the processor electronics 210 can cause the device 205 to perform broadcast or multicast functions according to the techniques presented in this disclosure. As one example, the processor electronics 210 can cause the device 205 to function as a broadcasting/multicasting node (e.g., an AP) that broadcasts or multicasts data to multiple distributive devices (e.g., STAs) through an ordered, efficient broadcast/multicast process with a broadcasting/multicasting announcement. As another example, the processor electronics 210 can cause the device 205 to function as one recipient (e.g., a STA) of broadcasting/multicasting data transmitted by a broadcasting/multicasting node (e.g., an AP). The device 205 can participate in a broadcast/multicast process with other recipients (e.g., other STAs) of the broadcasting/multicasting data, for example, according to information contained in a broadcasting/multicasting announcement transmitted by the broadcasting/multicasting node.

The device 205 can include transceiver electronics 215 (e.g., a transmitter, receiver, or transceiver) to send and/or receive wireless signals over one or more antennas 220a-220b. The one or more antennas 220a-220b can form a quasi-omni directional antenna pattern, a directional antenna pattern, or other antenna patterns for transmitting signals. In some implementations, transceiver electronics 215 can include multiple radio units. In some implementations, a radio unit includes a baseband unit (BBU) and a radio frequency unit (RFU) to transmit and receive signals. In some implementations, the device 205 includes dedicated circuitry for transmitting (e.g., a dedicated transmitter) and dedicated circuitry for receiving (e.g., a dedicated receiver). For example, transceiver electronics 215 can include one or more receivers that receive one or more signals from one or more antennas 220a-220b, transmitted over one or more WLAN channels.

The device 205 can include one or more memories 225 configured to store information such as data and/or instructions (e.g., computer-readable instructions that cause the device 205 to implement methods effecting the techniques presented in this disclosure).

Figure 3:
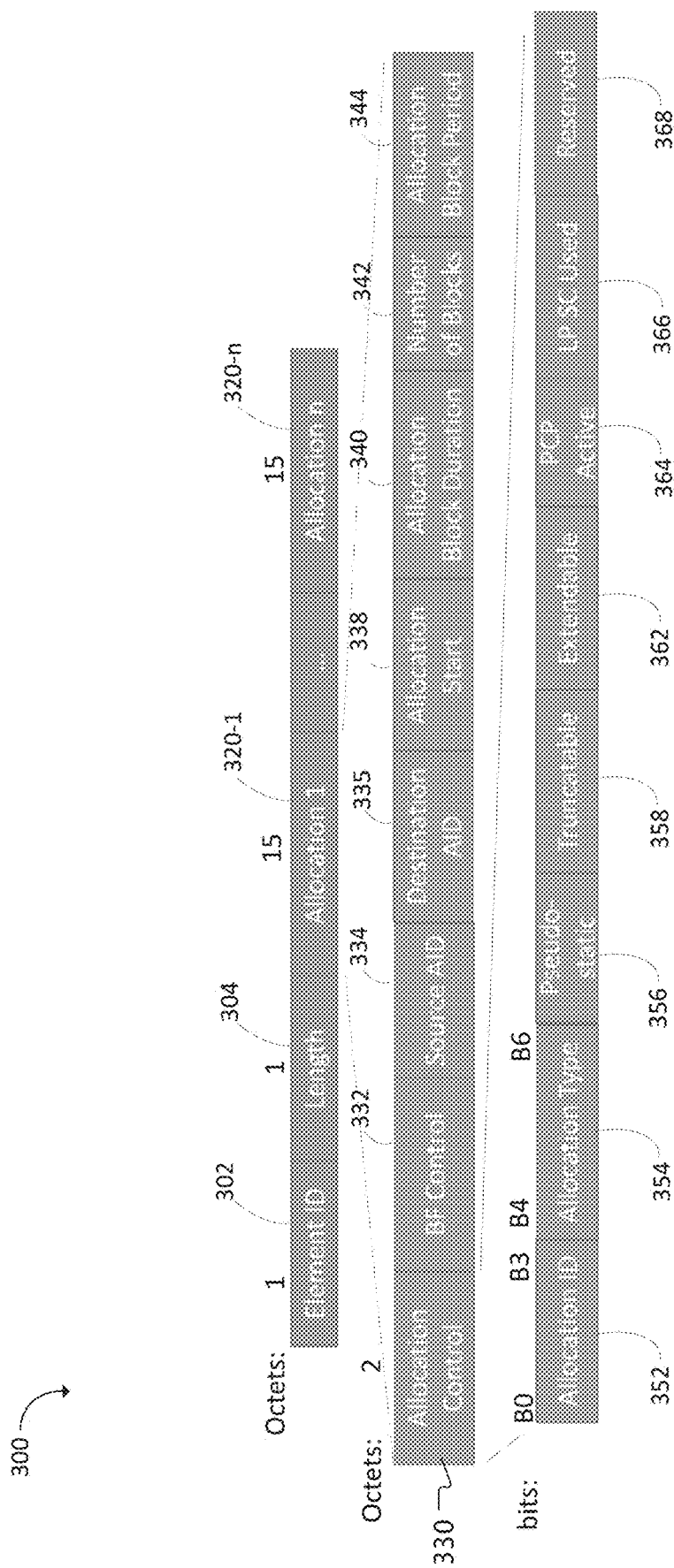
FIG. 3 is a diagram of an example of an extended schedule element for announcing a broadcast process, according to some implementations.

FIG. 3 is a diagram of an example of an extended schedule element 300 for announcing a broadcast process, according to some implementations. The extended schedule element 300 may be included in a beacon frame, announcement frame or other management frame exchanged between communication devices in wireless communication networks.

The extended schedule element 300 includes an element ID 302, a length field 304, and multiple allocation fields 320-1, . . . , 320-n. An allocation field (e.g., Allocation 1 320-1) can further include multiple sub-fields such as an allocation control 330, a beamforming (BF) control 332, a source association ID (AID) 334, a destination AID 335, an allocation start 338, an allocation block duration 340, a number of blocks 342, and an allocation block period 344.

In some implementations, the extended schedule element 300 can be used to announce a broadcast service period (SP) by setting the Destination AID 335 as a Broadcast AID or a Group ID of a destination STA group (e.g., a multicast or broadcast group). In some implementations, the Broadcast AID 335 is only used for legacy multi-gigabit (DMG)STAs.

In some implementations, an Allocation Control subfield 330 can include elements 352, 354, 356, 358, 362, 364, and 366 for indicating Allocation ID (Bits 0-3), Allocation Type (Bits 4-6), pseudo-static type, truncatable, extandable, whether the PCP is active, whether the linearly precoded (LP) single carrier (SC) is used, respectively and an element 368 reserved for future use. In some implementations, the Allocation Type 354 (Bits 4-6) can be used to explicitly schedule an efficient IEEE 802.11ay Broadcast/Multicast SP. For example, a bit sequence of 001 can be used to indicate a Broadcast SP and a bit sequence of 010 can be used to indicate a Multicast SP. Additional or different control signaling configurations can be designed to indicate a broadcast or multicast SP.

Figure 4:
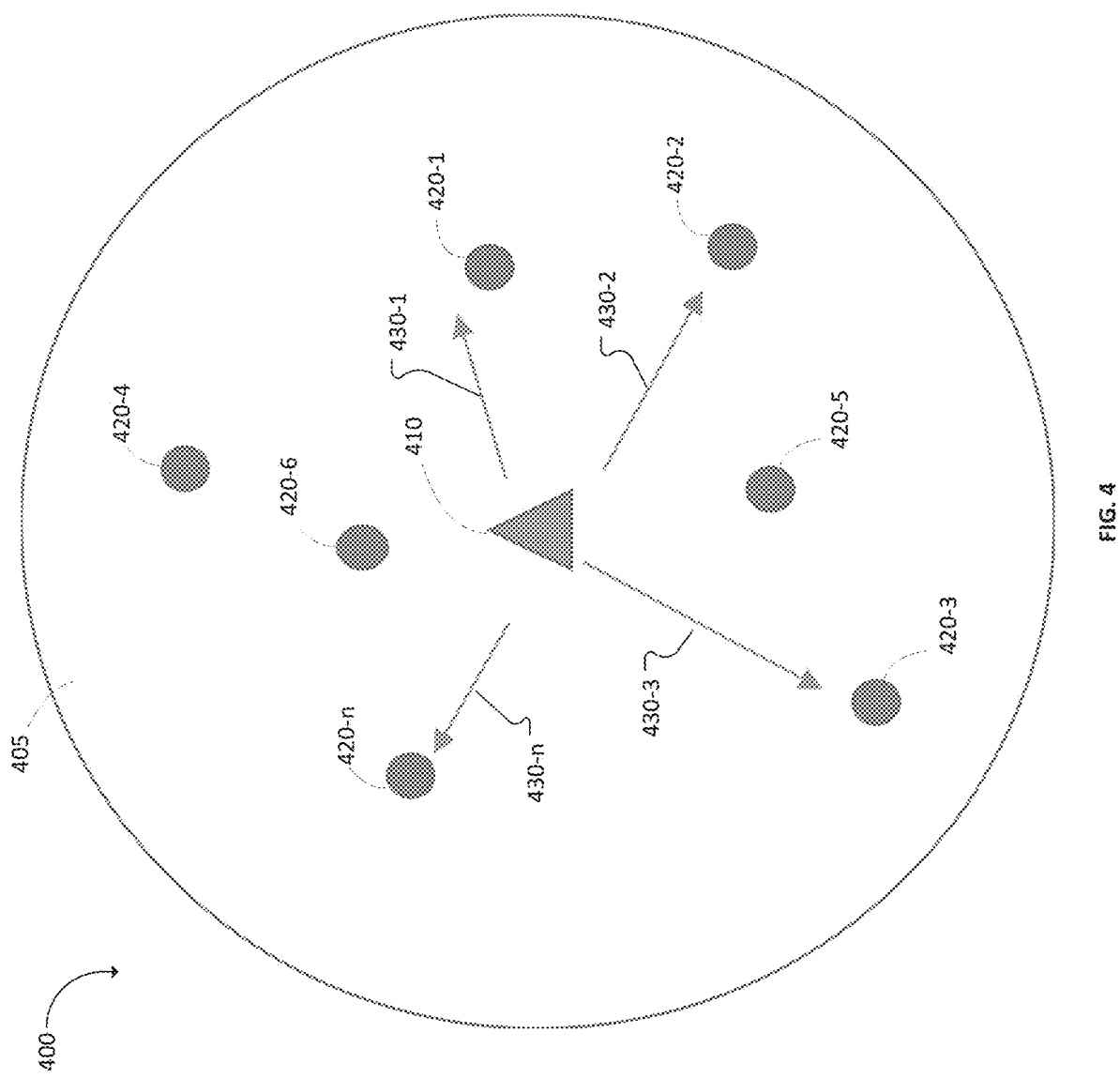
FIG. 4 shows a topology of an example of a wireless communication network, according to some implementations.

FIG. 4 shows a network topology 400 of an example of a wireless communication network 405, according to some implementations. The network topology 400 can represent the example WLAN 10-1 or 10-2 in FIG. 1, or another wireless communication network. For example, the network topology 400 shows a broadcasting/multicasting node 410 and multiple distributive nodes 420-1, 420-2, 420-3, 420-4, 420-5, 420-6, . . . , 420-n (collectively, 420). In some implementations, the broadcasting/multicasting node 410 represents a station capable of communication with other nodes 420, for example, sequentially or simultaneously, via the wireless communication media (e.g., RF channels) 430-1, 430-2, 430-3, . . . , 430-n (collectively, 430). The broadcasting/multicasting node 410 can represent a personal basic service set (PBSS) control point (PCP), an AP (e.g., the AP 14 in FIG. 1), a client station (e.g., the client station 25 in FIG. 1), or another device. In some implementations, an AP can serve as a PCP. The distributive node 420 can represent a client station (e.g., the client station 25 in FIG. 1), an AP (e.g., the AP 14 in FIG. 1), or another device.

In some implementations, the broadcasting/multicasting node 410 and multiple distributive nodes 420 are compliant with a communication protocol, such as,802.11ad or 802.11ay. The broadcasting/multicasting node 410 and multiple distributive nodes 420 can operate in a unicast, broadcast, or multicast mode.

In some implementations, the broadcasting/multicasting node 410 communicates to one or more of the multiple distributive nodes 420 sequentially or simultaneously. For example, in a unicast mode, the broadcasting/multicasting node 410 sends data to one of the multiple distributive nodes 420, using a quasi-omni-directional antenna pattern or a directional antenna pattern. In some implementations, in a broadcast or multicast data mode, the broadcasting/multicasting node 410 sends broadcast or multicast data frames to multiple distributive nodes 420 in a DTI, via a quasi-omni-directional pattern.

Each of the distributive nodes 420 can communicate with the broadcasting/multicasting node 410, using a quasi-omni-directional antenna pattern or a directional antenna pattern. For example, a distributive node 420 can receive data from the broadcasting/multicasting node 410, using highly directional antenna pattern, while sending data to the broadcasting/multicasting node 410 using quasi-omni-directional antenna patterns.

To enable reliable wireless communications between the broadcasting/multicasting node 410 and multiple distributive nodes 420, beamforming training has been performed between the broadcasting/multicasting node 410 and multiple distributive nodes 420. For example, the broadcasting/multicasting node 410 and one of the multiple distributive nodes 420 can determine the appropriate receive and transmit antenna sectors or antenna pattern configurations, for example, by transmitting a bidirectional training frame sequence.

In some implementations, the beamforming phase includes a sector level sweep (SLS) phase and a beam refinement phase (BRP). The SLS is an initial training phase for determining a coarse-grain antenna sector configuration. Based on information obtained in the SLS phase, the BRP (optional in some implementations) fine-tunes the selected sectors. During SLS, each of the two stations either trains its transmit antenna sector or the receive antenna sector.

Figure 5:
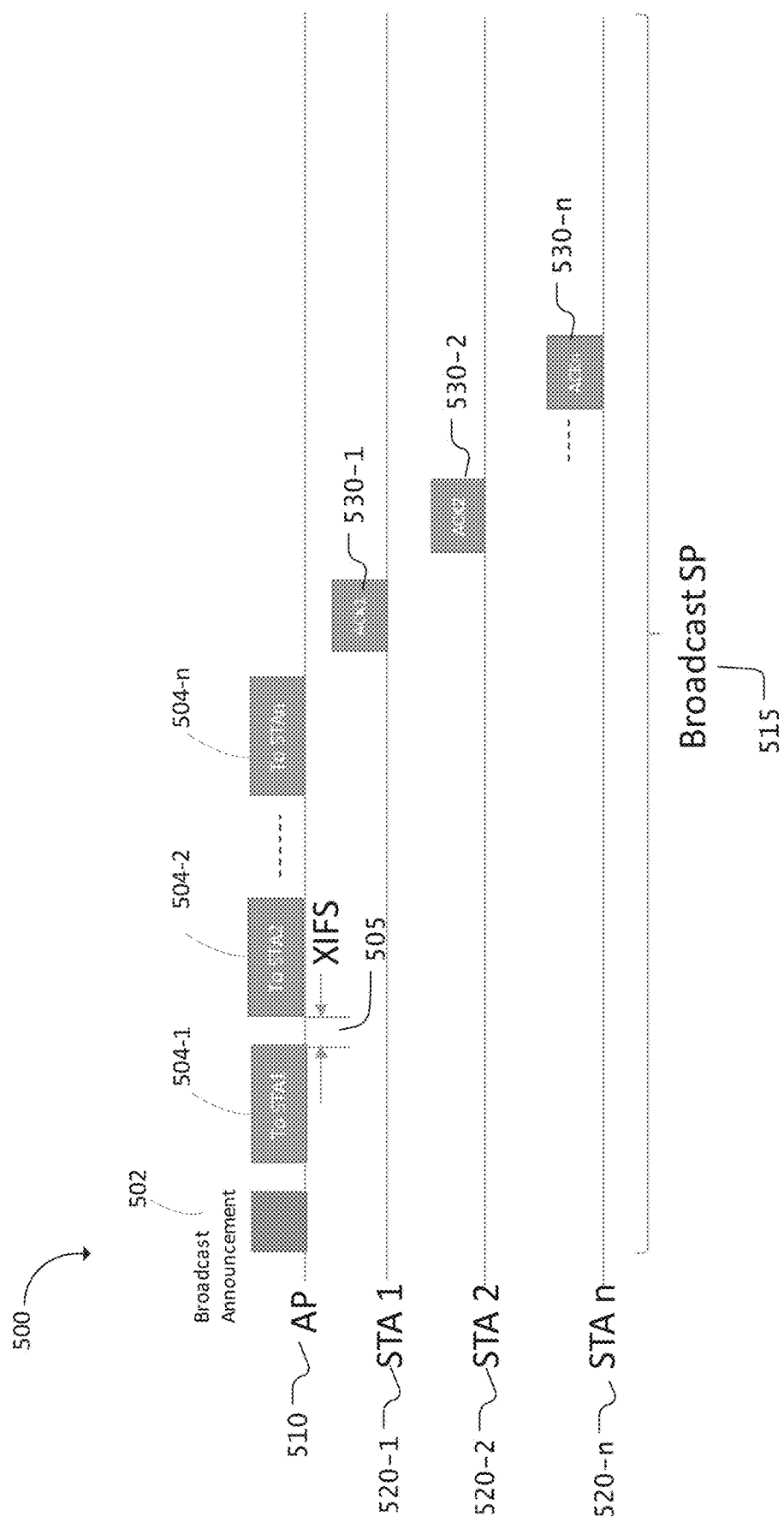
FIG. 5 is a diagram showing an example of a broadcast process among an access point (AP) and multiple client stations (STAs), according to some implementations.

FIG. 5 is a diagram showing an example of a broadcast process 500 among an AP 510 and multiple STAs 520-1, 520-2, . . . 520-n (collectively, 520). As an example, the AP 510 can represent the broadcasting/multicasting node 410 and the multiple STAs 520-1, 520-2, . . . 520-n can represent the multiple distributive nodes 420 in FIG. 4.

During a broadcast service period (SP) 515, to help the synchronization, the AP 510 sends a broadcast announcement 502 to all or a subset of the multiple STAs 520. In some implementations, the AP sends the broadcast announcement 502 using a quasi-omni-directional antenna pattern. The AP 510 may send the broadcast announcement 502 multiple times. In some implementations, the broadcast announcement 502 may be aggregated with the data frames to STAs. For example, the broadcast announcement frame is aggregated with the data frame that is sent to the STA before the broadcast SP.

In some implementations, the broadcast announcement 502 specifies the end time of the last frame to STAn 520-n and the end time of the broadcast SP 515. In some implementations, the broadcast announcement 502 includes an indicator of the order of sequential frames to different STAs (e.g., the broadcast or data frames 504-1, 504-2, . . . , 504-n (collectively, 504) to STAs 520-1, 520-2, . . . 520-n, respectively). The indicator can be an explicit array or sequence, an index mapping to an order in a lookup table stored at the STAs, or a value indicating the order is the same as a previously defined one (e.g., a default order or an order specified in a previously transmitted broadcast announcement 502). Additional or different implementations are possible.

In some implementations, the same order will be used by the STAs 520-1, 520-2, . . . , 520-n for sending the acknowledgement (ACK or block ACK (BAs)) frames 530-1, 530-2, . . . , 530-n (collectively, acknowledgement frames 530), respectively. Each acknowledgement frame 530 can include an indicator representing that a single data frame or a block of multiple data frames is successfully received and decoded by the recipient or not. In some implementations, different broadcast SP 504 can employ different order.

In some implementations, the frames 504 to different STAs 520 can use a different modulation and coding scheme (MCS) to best utilize the spectrum. The acknowledgement frames 530 by different STAs 520 may use the same MCS.

In some implementations, unlike the process 500, a broadcast/multicast process can be implemented in a sequential data-and-acknowledgement manner. In the sequential data-and-acknowledgement implementation, the AP 510 sends a next data frame 504-$i$ to a next station, STA 520-$i$, after receiving an acknowledge frame 530-$j$ from a previous station, STA 520-$j$, to which the AP 510 has sent a data frame 504-$j$. To protect each frame from collision, a short inter-frame space (SIFS) time interval can be used as a guard interval. The SIFS is the amount of time (e.g., in microseconds) required for a wireless device (e.g., the STA 520) to process a received frame (e.g., a data frame 504) and to respond with a response frame (e.g., an acknowledgement frame 530). As such, after sending the data frame 504-$j$ to the STA 520-$j$, the AP 510 needs to wait at least a SIFS time interval for receiving the acknowledgement frame 530-$j$ from the STA 520-$j$. The AP 510 may also need to wait for another SIFS time interval to process the received frame (e.g., the acknowledgement frame 530-$j$) and to send a next data frame 504-$i$ to STA 520-$i$.

By contrast, the process 500 has a smaller overhead and shorter latency than the sequential data-and-acknowledgement implementation. As illustrated in FIG. 5, all the acknowledgement frames 530-1, 530-2, . . . , 530-n are sent by the STAs 520-1, 520-2, . . . 520-n, respectively, after the AP 510 finishes transmitting all the data frames 504-1, 504-2, . . . , 504-n. As such, an inter-frame spacing (XIFS) time interval 505 between consecutive data frames 504 transmitted by the AP 510 can be shorter than the SIFS as the AP 510 does not need to account for the processing and responding time of the STAs 520 and transmission delay of the acknowledgement frames 530. For example, the XIFS only accounts for the time necessary for the AP to switch the antenna configuration for different directions, which is normally shorter than SIFS used in 802.11ad.

Figure 6:
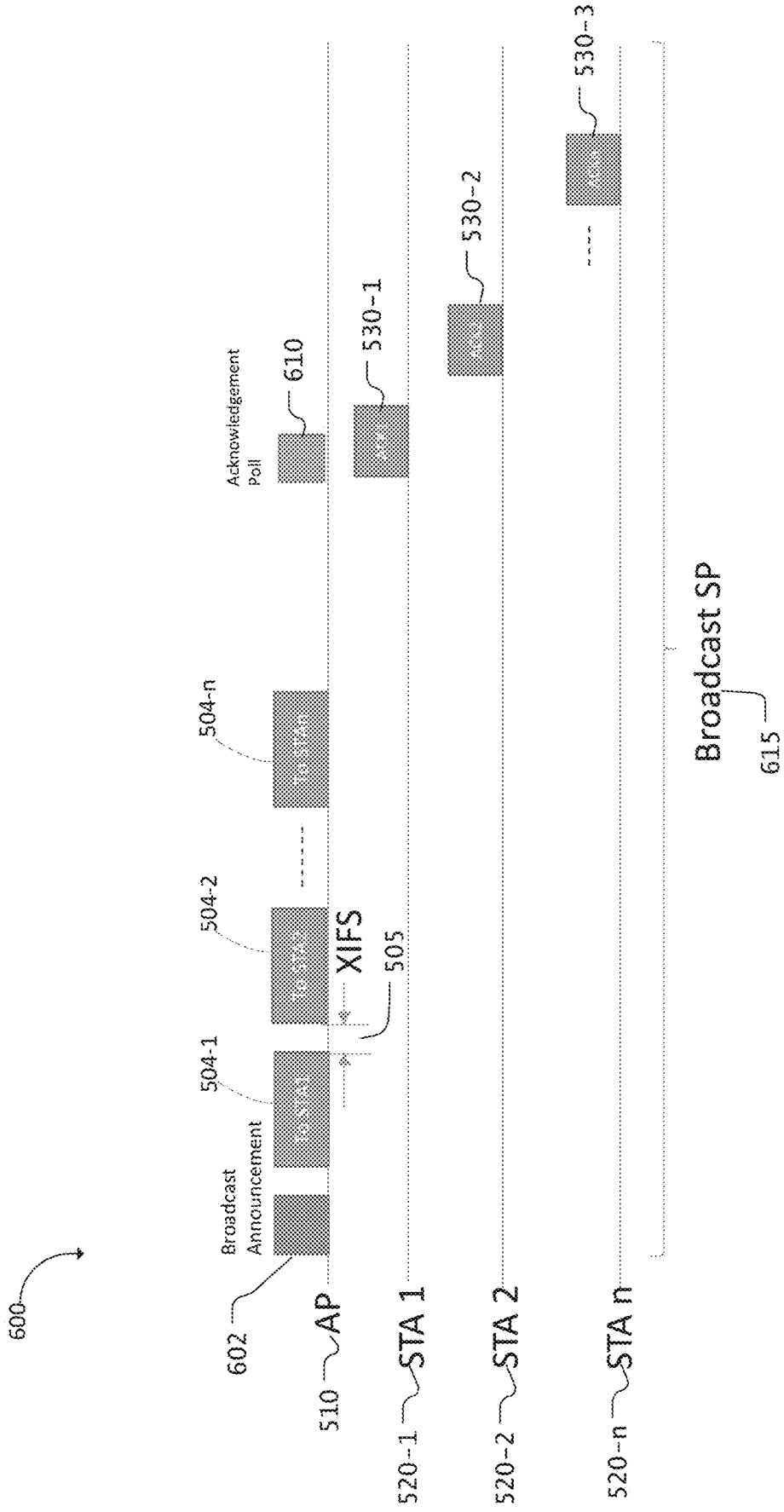
FIG. 6 is a diagram showing an example of another a broadcast process, according to some implementations.

FIG. 6 is a diagram showing an example of another a broadcast process 600, according to some implementations. The broadcast process 600 is a variation of the broadcast process 500, among the AP 510 and the multiple STAs 520. In some implementations, during a broadcast SP 615, the AP 510 can use a poll frame 610 to ask for sequential acknowledgement frames 530 from STAs 520, for example, if the broadcast announcement 602 does not specify the end time of the last frame to the STA (e.g., the data frame 530-n to the STA 520-n). The poll frame 610 includes, for example, the list of STAs to be polled for a block acknowledgement (BlockAck) frame, some fields of Block ACK Request (BAR) control and necessary BAR Information for each STA such as a traffic identifier (TID_INFO) and Starting Sequence Number. Note that, in some implementations, not all the fields in BAR control and BAR Information are necessary. The content of the poll frame can depend on the properties of the established BlockAck session between the AP 510 and STAs 520. The poll frame 610 can be transmitted in a similar or different manner as the broadcast announcement 502, for example, by using a quasi-omni-directional antenna pattern or directional antenna pattern.

Figure 7:
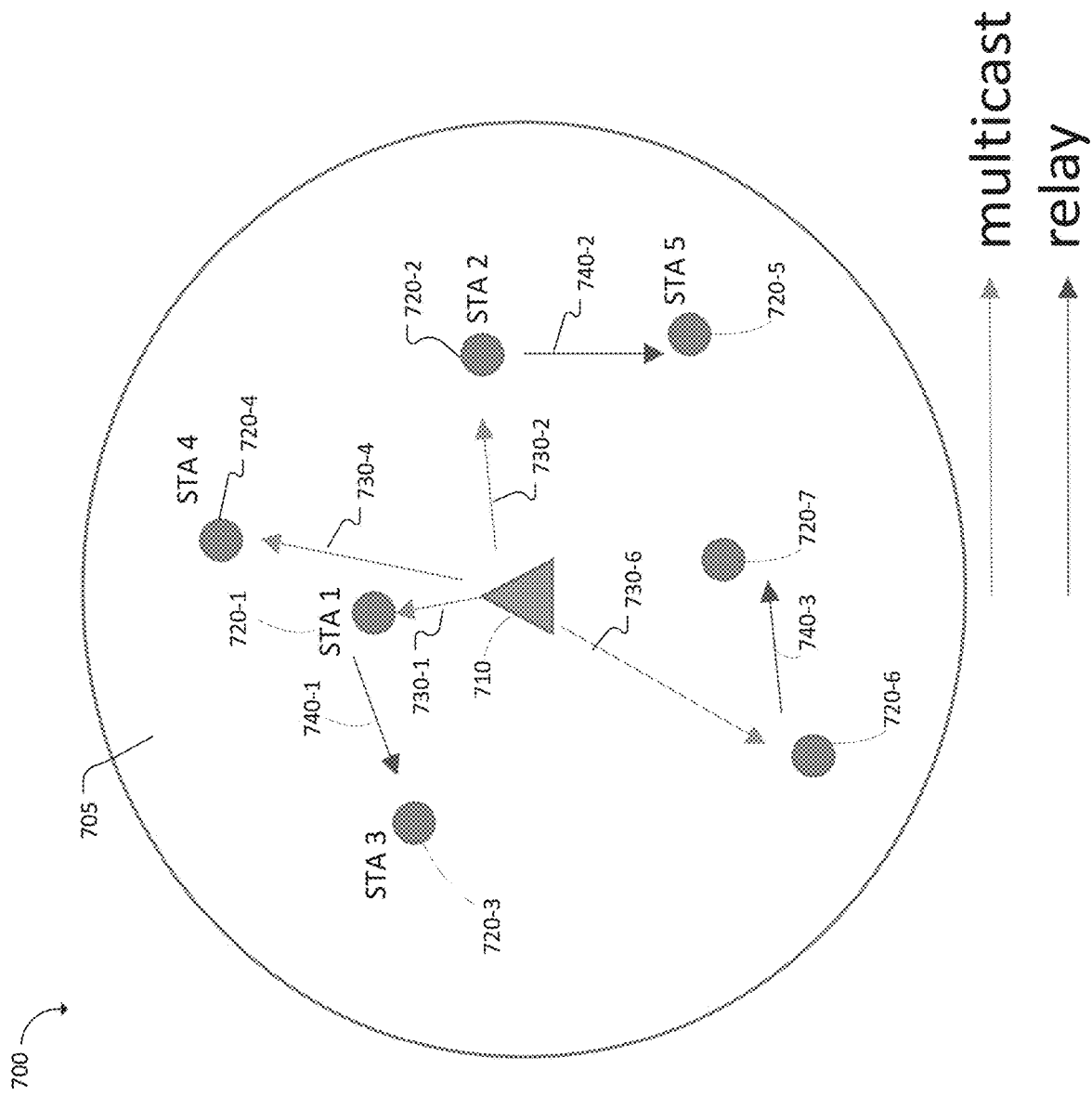
FIG. 7 shows another network topology of an example of a wireless communication network, according to some implementations.

FIG. 7 shows a network topology 700 of an example of a wireless communication network 705, according to some implementations. The network topology 700 can represent the example WLAN 10-1 or 10-2 in FIG. 1, or another wireless communication network. The network topology 700 is a variation of the network topology 400 in FIG. 4. For example, the network topology 700 shows a broadcasting/multicasting node 710 and multiple distributive nodes 720-1, 720-2, 720-3, 720-4, 720-5, 720-6, and 720-7 (collectively, distributive nodes 720). In some implementations, the broadcasting/multicasting node 710 represents a station capable of communication with other nodes 720, for example, directly or indirectly.

For example, the broadcasting/multicasting node 710 can collect information from the multiple distributive nodes 720 and build a representation of the network topology 700 of the wireless communication network 705, for example, as a spanning-tree like connectivity map(s) or another data structure. For example, the network topology 700 includes distributive nodes 720 in the wireless communication network 705 that satisfy a certain condition (e.g., having a path with a limited number of hops to the broadcasting/multicasting node 710). As an example shown in FIG. 7, the network topology 700 includes distributive nodes 720, each of which has 1 or 2 hops from the broadcasting/multicasting node 710.

In some implementations, the broadcasting/multicasting node 710 can divide the multiple distributive nodes 720 into two or more groups or tiers. In some implementations, a first tier of distributive nodes 720 can be used as relays to facilitate the communications between the broadcasting/multicasting node 710 and a second tier of distributive nodes 720.

Various criteria can be used to divide the groups or tiers. As an example, the first tier includes each distributive node 720 that has a direct link from the broadcasting/multicasting node 710, while the second tier includes each distributive node 720 that does not have a direct link from the broadcasting/multicasting node 710. A direct link between two nodes in a wireless communication system can be defined based on, for example, a channel quality, bandwidth, distance, location, latency, or other criteria. As an example, if a wireless channel or link between two nodes has a channel quality that meets or exceeds a specified threshold, the two nodes can be regarded to have a direct link and can use the direct link for communication. On the other hand, if the channel quality of the wireless channel or link between the two nodes falls below the specified threshold, the two nodes can be regarded as not having a direct link and may resort to another node as a relay for reliable communication between the two nodes.

As an example shown in FIG. 7, the network topology 700 includes a first tier of distributive nodes 720-1, 720-2, 720-4, and 720-6 and a second tier of distributive nodes 720-3, 720-5, and 720-7. Each of the first tier of distributive nodes 720-1, 720-2, 720-4, and 720-6 has a respective 1-hop or direct link 730-1, 730-2, 730-4, and 730-6 from the broadcasting/multicasting node 710. Each of the second tier of distributive nodes 720-3, 720-5, and 720-7 has a 2-hop or indirect link from the broadcasting/multicasting node 710, via the relay link 740-1, 740-2, and 740-3 with the first tier of distributive nodes 720-1, 720-2, and 720-6, respectively.

The broadcasting/multicasting node 710 can represent a personal basic service set (PBSS) control point (PCP), an AP (e.g., the AP 14 in FIG. 1), a client station (e.g., the client station 25 in FIG. 1), or another device. In some implementations, an AP can serve as a PCP. The distributive node 720 can represent a client station (e.g., the client station 25 in FIG. 1), an AP (e.g., the AP 14 in FIG. 1), or another device.

In some implementations, the broadcasting/multicasting node 710 and multiple distributive nodes 720 are compliant with a communication protocol, such as 802.11ad or 802.11ay. The broadcasting/multicasting node 710 and multiple distributive nodes 720 can operate in a unicast, broadcast, or multicast mode. For example, the broadcasting/multicasting node 710 broadcasts to the distributive nodes 720-1, 720-2, 720-3, 720-4, 720-5, 720-6, and 720-7 directly or indirectly. As the example shown in FIG. 7, the broadcasting/multicasting node 710 can multicast data frames to the first tier of distributive nodes 720-1, 720-2, 720-4, and 720-6 through the 1-hop link 730-1, 730-2, 730-4, and 730-6, respectively. The first tier of distributive nodes 720-1, 720-2, and 720-6 can relay the data frames to the second tier of distributive nodes 720-3, 720-5, and 720-7 using the relay links 740-1, 740-2, and 740-3, respectively.

The broadcasting/multicasting node 710 and the multiple distributive nodes 720 can perform beamforming to determine the appropriate receive and transmit antenna sectors or patterns, for example, in a similar manner as described with respect to FIG. 4.

Figure 8:
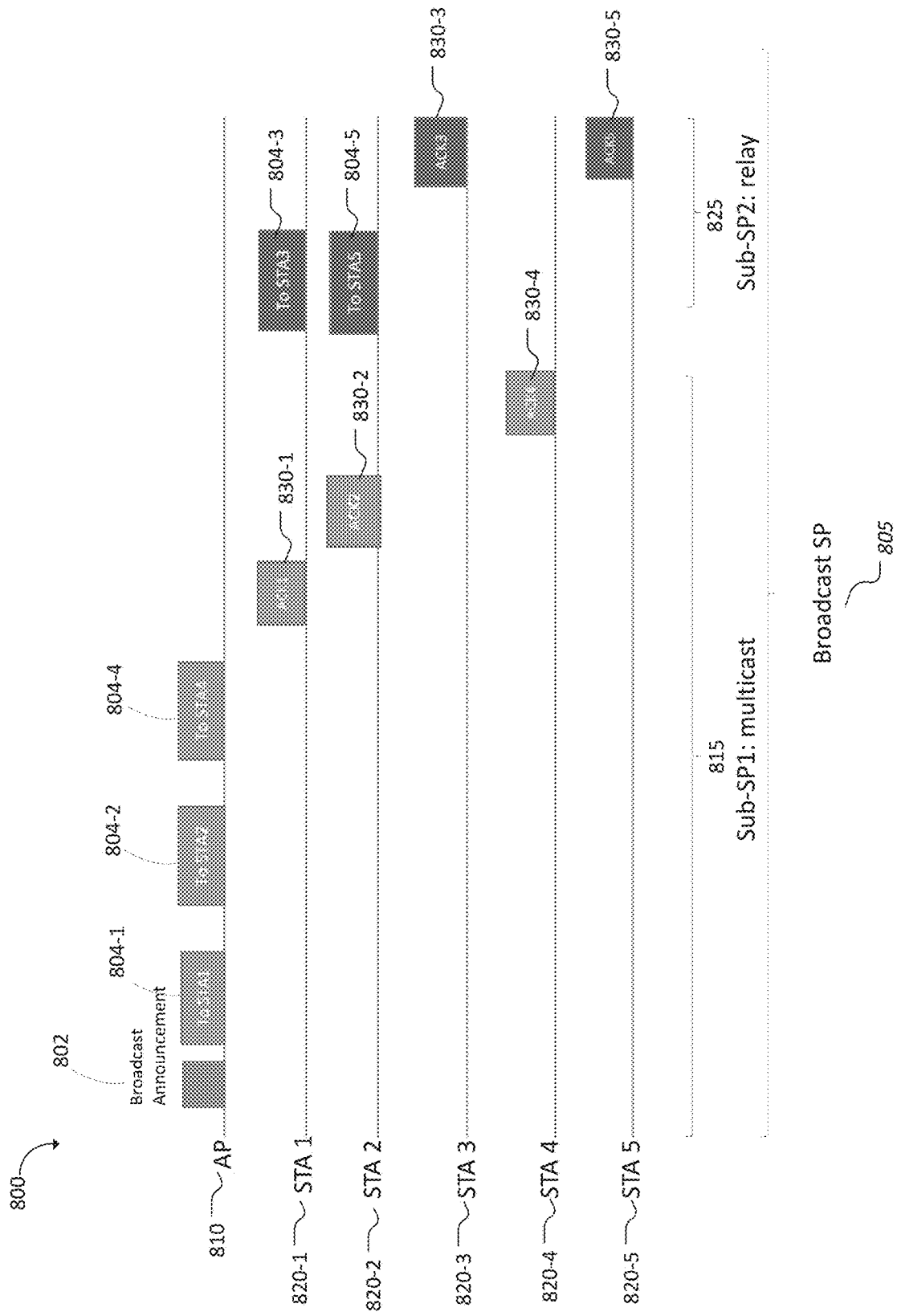
FIG. 8 is a diagram showing an example of a broadcast process among an AP and multiple STAs, according to some implementations.

FIG. 8 is a diagram showing an example of a broadcast process 800 among an AP 810 and a broadcast group of STAs 820-1, 820-2, 820-3, 820-4, and 820-5 (collectively, STAs 820). As an example, the AP 810 can represent the broadcasting/multicasting node 710 and the multiple STAs 820 can represent the multiple distributive nodes 720 in FIG. 7.

The broadcast process 800 includes a broadcast service period (SP) 805 that is divided into two sub SPs, a multicast sub-SP1 815, and a relay sub-SP2 825. The two consecutive sub-SPs 815 and 825 can be scheduled by the AP 810.

During the multicast sub-SP1 815, the AP 810 multicasts data frames (e.g., 804-1, 804-2, and 804-4) to STAs belonging to a multicast group that is a subset of the broadcast group. As shown in FIG. 8, the multicast group includes STAs 820-1, 820-2, and 820-4 out of the broadcast group of STAs 820-1, 820-2, 820-3, 820-4, and 820-5. One or more of the STAs in the multicast group can serve as relays for transmitting the broadcast data to STAs (e.g., STAs 820-3 and 820-5) in the broadcast group but outside of the multicast group.

In some implementations, the multicast group can represent the first tier of distributive nodes 720 in FIG. 7 that have a direct link to the broadcasting/multicasting node 710 (e.g., the AP 810). The STAs that are outside of the multicast group can represent some or all of the second tier of distributive nodes 720 in FIG. 7 that do have a direct link to the broadcasting/multicasting node 710 (e.g., the AP 810).

In some implementations, during the multicast sub-SP1 815, the AP 810 and STAs (e.g., 820-1, 820-2, and 820-4 as shown in FIG. 8) belonging to the multicast group operate accordingly to the broadcast/multicast process 500 or 600 in FIG. 5 or FIG. 6. As the example illustrated in FIG. 8, the AP 810 sends a broadcast announcement 802 to STAs in the multicast group, for example, using a quasi-omni-directional antenna pattern.

In some implementations, the broadcast announcement 802 specifies one or more of an end time of the last frame (e.g., the frame 804-4) to STAs in the multicast group, an end time of the multicast sub-SP1 815 or an indicator of the order of sequential frames to the STAs in the multicast group. In some implementations, the STAs in the multicast group follow the same order to send the acknowledgement frames (e.g., acknowledgement frames 830-1, 830-2, and 820-4) back to the AP 810.

After the multicast sub-SP1 815 ends, and during the relay sub-SP2 825, one or more STAs (e.g., STAs 820-1 and 820-2) belonging to the multicast group forward the data frames (e.g., data frames 804-3 and 804-5) to STAs (e.g., STAs 820-3 and 820-5) that are outside of the multicast group, respectively. The one or more STAs belonging to the multicast group may have respective direct links with the STAs outside of the multicast group, and thus serve as relay nodes to facilitate the broadcast operation.

In some implementations, the relay operation can be built upon the multi-gigabit (DMG) relay operation or enhanced relay operation in IEEE 802.11ay (the enhanced relay operation for broadcast can have simplified relay discovery/selection/operation procedure).

The data frames 804-3 and 804-5 transmitted by the STAs 820-1 and 820-2 can be the same or substantially the same (e.g., except the headers) as the data frames 804-1 and 804-2 received from the AP 810, respectively, as the broadcast data.

In some implementations, STAs 820-1 and 820-2 relay the data frames 804-3 and 804-5 to the STAs 820-3 and 820-5 (e.g., as two-hop-away STAs). In some implementations, the STAs 820-1 and 820-2 relay the data frames 804-3 and 804-5 to the STAs 820-3 and 820-5 simultaneously, via spatial reuse, for example, using respective directional antenna patterns.

Upon receiving the data frames 804-3 and 804-5, the STAs 820-3 and 820-5 can send acknowledgement frames 830-3 and 830-5, respectively. In some implementations, the STAs 820-3 and 820-5 send acknowledgement frames 830-3 and 830-5 back to the AP 810, directly. In some implementations, the STAs 820-3 and 820-5 send acknowledgement frames 830-3 and 830-5 to the STAs 820-1 and 820-2 and the STAs 820-1 and 820-2 relay the acknowledgement frames back to the AP 810, respectively. In some implementations, the STAs 820-3 and 820-5 send acknowledgement frames 830-3 and 830-5 simultaneously via spatial reuse, for example, using respective directional antenna patterns.

In some implementations, spatial reuse allows use of the same spectrum at the same time and thus provides airtime saving. But controlling information indicating the STA grouping and scheduling may be needed to ensure spatial reuse gain. For example, the AP 810 may need to signal to the STAs 820 the respective members of the broadcast group and the multicast group in control signaling (e.g., the broadcast announcement 802 or other messages). In some implementations, to enable relay operation, additional information (e.g., multicast indication, next-hop STA IDs) should be signaled to the relay STA in the multicast frames (e.g., the data frames 804-1 and 804-2). In some implementations, some or all of these types of information can be included in additional control field in MAC Header or a certain field in enhanced DMG (EDMG) header.

Figure 9:
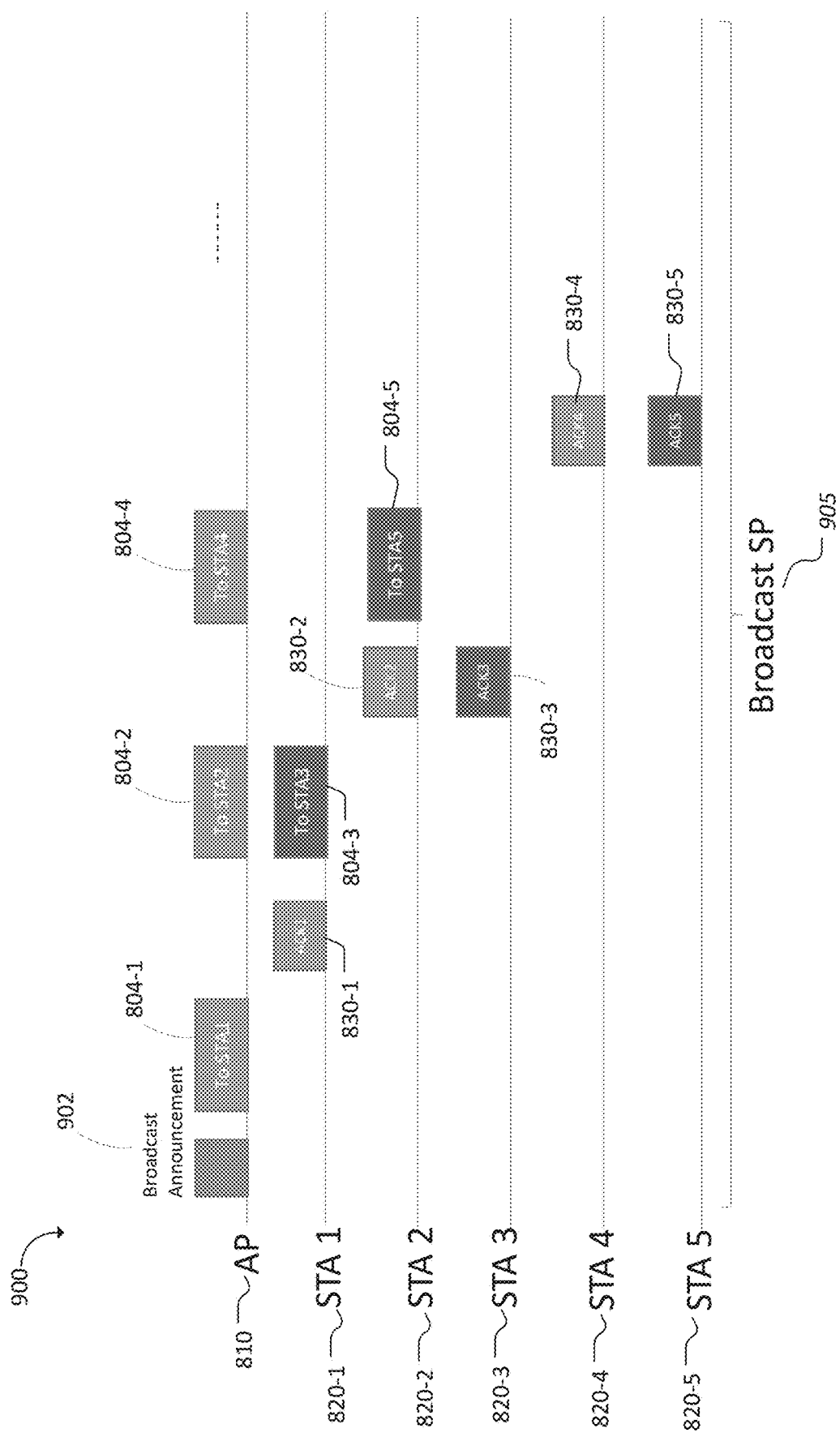
FIG. 9 is a diagram showing an example of another broadcast process 900, according to some implementations.

FIG. 9 is a diagram showing another example of a broadcast process 900. The broadcast process 900 is a variation of the broadcast process 800 among the AP 810 and the multiple STAs 820 in FIG. 8. Unlike the broadcast process 800, that includes distinctive, non-overlapping sub-SP1 815 and relay sub-SP1 825, the broadcast process 900 allows multicast transmission by the AP 810 and relay transmission by one or more STAs 820 to be performed simultaneously.

As shown in FIG. 9, during the broadcast SP 905, the AP 810 sends a broadcast announcement 902 to multiple STAs, for example, using a quasi-omni-directional antenna pattern. The broadcast announcement 902 can be different from the broadcast announcement 802 in FIG. 8, for example, in that announcement 902 includes appropriate information or otherwise indicates that simultaneous multicast transmission by the AP 810 and relay transmission by one or more of the STAs 820 is enabled.

Once the STA 820-1 receives a broadcast data frame 804-1 from the AP 810 and sends the acknowledgment frame 830-1 back to the AP 810, the STA 820-1 can relay the broadcast data to STA 820-3 that is outside the multicast group (e.g., without a direct link to the AP 810) by transmitting a data frame 804-3 simultaneously with the AP 810's transmission of the data frame 804-2 to STA 820-2 that belongs to the multicast group (e.g., with a direct link to the AP 810). In other words, a relay node (e.g., STA 820-1) can relay the broadcast data received from the AP 810 without waiting until after all the STAs (e.g., STAs 820-1, 820-2, and 820-4) belonging to the multicast group receive the broadcast data from the AP 810. As such, the broadcast process 900 may achieve enhanced flexibility and efficiency.

In some implementations, the STAs 820-2 and 820-3 can send acknowledgement frames 830-2 and 830-3 simultaneously, both to the AP 810, or to the AP 810 and the STA 820-1, respectively.

Similarly, the STA 820-2 can relay the broadcast data to STA 820-5 that is outside the multicast group by transmitting a data frame 804-5 simultaneously with the AP 810's transmission of the data frame 804-4 to STA 820-4 that belongs to the multicast group. The STAs 820-4 and 820-5 can send acknowledgement frames 830-4 and 830-5 simultaneously, both to the AP 810, or to the AP 810 and the STA 820-2, respectively. In some implementations, additional or different order or scheduling scheme among the multiple STAs can be used.

Figure 10:
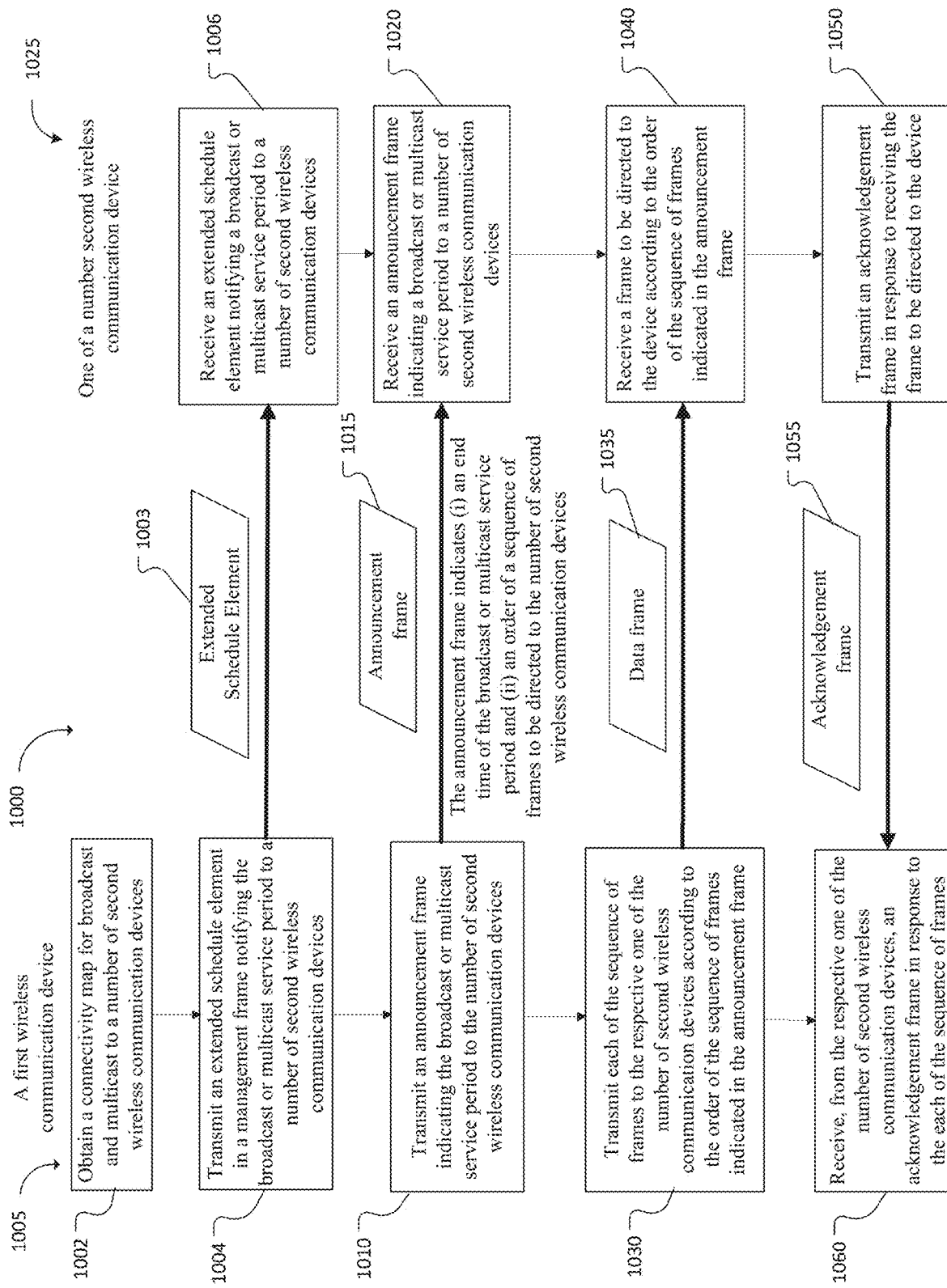
FIG. 10 is a flowchart showing an example of a broadcast or multicast process in a wireless communication system (e.g., a WLAN system).

FIG. 10 is a flowchart showing an example of a broadcast process 1000 in a wireless communication system (e.g., a WLAN system operating pursuant to IEEE 802.11ad or 11ay standard). The process 1000 can be performed by a first wireless communication device 1005 (e.g., the access point 14 of FIG. 1) and a number of second communication devices (e.g., a client station 25 of FIG. 1.), although only one of the number of second communication devices, 1025, is shown in FIG. 10. Each of the first and second wireless communication devices includes receiver and processor electronics for performing some or all of the operations of the process 1000. In some implementations, the processor electronics include a processor programmed with computer-readable instructions that, when run, causes the receiving device to perform some or all operations of the process 1000.

At 1002, the first wireless communication device obtains a connectivity map (e.g., a spanning-tree like network topology map or other data structure) for broadcast and multicast to the plurality of second wireless communication devices and/or a number of third wireless communication devices before a broadcast and multicast service period. Obtaining the connectivity map can include can generating the connectivity map, for example, based on the beamforming training information received from the number of second wireless communication devices and/or the number of third wireless communication devices. In some implementations, obtaining the connectivity map can include retrieving, reading, or receiving the connectivity map from a database of the first wireless communication device or another device.

At 1004, the first wireless communication device transmits an extended schedule element 1003 (e.g., the extended schedule element 300 in FIG. 3) in a management frame (e.g., a beacon frame or announcement frame) that notifies the number of second wireless communication devices and/or the number of third wireless communication devices the scheduled broadcast or multicast service period.

At 1006, the one of the number of second wireless communication device, 1025, receives extended schedule element 1003 in the management frame that notifies the broadcast or multicast service period to the number of second wireless communication devices. The second wireless communication device 1025 can decode the information contained in the extended schedule element (e.g., the Destination AID 335 and/or the Allocation Type 354 (Bits 4-6) contained in the extended schedule element 300 in FIG. 3). As such, the second wireless communication device 1025 can prepare for the broadcast or multicast service period.

At 1010, the first wireless communication device 1005 transmits an announcement frame 1015 indicating a broadcast or multicast service period to a number of second wireless communication devices. The announcement frame 1015 can be one of the broadcast or multicast announcement frames 502, 602, 802, or 902 in FIGS. 5, 6, 8 and 9, respectively. In some implementations, the announcement frame 1015 indicates (i) an end time of the broadcast or multicast service period and (ii) an order of a sequence of frames to be directed to the number of second wireless communication devices. In some implementations, the announcement frame 1015 further indicates an end time of a last frame in the sequence of frames within the broadcast or multicast service period. Each of the sequence of frames is directed to a respective one of the number of second wireless communication devices. Each of the sequence of frames can include broadcast or multicast data to be directed to the number of second wireless communication devices. The sequence of frames can be, for example, the sequence of frames 504-1, 504-2, . . . , 504-n in FIG. 5 or FIG. 6, or the sequence of frames 804-1, 804-2, . . . , 804-5 in FIG. 8 or FIG. 9.

In some implementations, the first wireless communication device 1005 transmits the announcement frame 1015 using a quasi-omni-directional antenna pattern. In some implementations, the first wireless communication device 1005 transmits the announcement frame 1015 by aggregating the announcement frame 1015 with data frames to the number of second wireless communication devices before the start of the broadcast or multicast service period.

At 1020, the one of the number of second wireless communication device, 1025, receives the announcement frame 1015, indicating the broadcast or multicast service period to the number of second wireless communication devices. The second wireless communication device 1025 can decode the information contained in the announcement frame 1015, prepare for, and enter into the broadcast or multicast service period.

At 1030, the first wireless communication device 1005 transmits each of the sequence of frames directed to the respective one of the number of second wireless communication devices according to the order of the sequence of frames indicated in the announcement frame. In some implementations, the first wireless communication device 1005 transmits each of the sequence of data frames using a directional antenna pattern steered towards the respective one of the number of second wireless communication devices. For example, as shown in FIG. 10, the first wireless communication device 1005 transmits a data frame 1035 directed to the second wireless communication device 1025, for example, to leverage the high data rate of the narrow beam transmission, by using the directional antenna pattern.

In some implementations, two adjacent frames in the sequence of frames are separated by an inter-frame spacing time interval (XIFS) that is shorter than a short inter-frame space (SIFS).

At 1040, the one of the number of the second wireless communication devices, 1025, receives, for example, using a directional antenna pattern or a quasi-omni-directional antenna pattern, the one of the sequence of frames, 1035. In some implementations, the one of the number of the second wireless communication devices, 1025, receives the one of the sequence of frames 1035, according to the order of the sequence of frames indicated in the announcement frame 1015. For example, if the one of the number of second wireless communication devices 1025 represents the STA 520-n in FIG. 5, the second wireless communication devices 1025 receive the data frame 1035 in the nth place in the sequence of frames from the number of second wireless communication devices (i.e., as the frame 504-n), according to the order of the sequence of frames indicated in the announcement frame 502, in FIG. 5.

At 1050, the one of the number of second wireless communication devices, 1025, transmits an acknowledgement frame 1055 in response to the one of the sequence of frames 1035. For example, the acknowledgement frame 1055 can represent one of the acknowledgement frames 530-1, 530-2, . . . , 530-n in FIG. 5 or FIG. 6, and the acknowledgement frames 830-1, 830-3, . . . , 830-5 in FIG. 8 or FIG. 9.

In some implementations, the acknowledgement frame 1055, in response to the one of a sequence of acknowledgement frames is transmitted from the number of second wireless communication devices according to the order of the sequence of frames indicated in the announcement frame. For example, the second wireless communication device 1025 transmits the acknowledgement frame 1055, according to the order of the sequence of frames indicated in the announcement frame 502. Take the process shown in FIG. 5 as an example, if the one of the number of second wireless communication devices 1025 represents the STA 520-3, the second wireless communication devices 1025 transmits the acknowledgement frame 1055 in the third place in the sequence of acknowledgement frames from the number of second wireless communication devices (i.e., as the acknowledgement frame 530-3), according to the order of the sequence of frames indicated in the announcement frame 502, in FIG. 5.

At 1060, the first wireless communication device 1005 receives, from the respective one of the number of second wireless communication devices, an acknowledgement frame in response to the one of the sequence of frames. In some implementations, the acknowledgement frame is one of a sequence of acknowledgement frames, where each of the sequence of acknowledgement frames is in response to the corresponding each of the sequence of frames directed to one of the number of second wireless communication devices. For example, the first wireless communication device 1005 receives, from the second wireless communication device 1025, an acknowledgement frame 1055 in response to the one of the sequence of frames 1035, directed to the second wireless communication device 1025. In some implementations, the acknowledgement frame 1055 in response to the one of the sequence of frames 1035, is received according to the order of the sequence of frames indicated in the announcement frame 1015.

In some implementations, the first wireless communication device 1005 receives the acknowledgement frame in response to the one of the sequence of frames after transmitting all of the sequence of frames to be directed to the number of second wireless communication devices, for example, in a similar manner to the processes 500, 600, and 800, described with respect to FIGS. 5, 6, and 8.

In some implementations, the first wireless communication device 1005 transmits a polling frame (e.g., polling frame 610 in FIG. 6) to trigger transmission of the sequence of acknowledgement frames from the number of second wireless communication devices, according to the order of the sequence of frames indicated in the announcement frame 1015, for example, according to the process 600 described with respect to FIG. 6.

In some implementations, at least one of the number of second wireless communication devices (e.g., the second wireless communication device 1025 or another second wireless communication device) serves as a relay between the first wireless communication device 1005 and at least one third wireless communication device (e.g., STAs 820-3 and 820-5 in FIGS. 8 and 9). In some implementations, the at least one of the number of second wireless communication devices transmits the frame to be directed to the at least one third wireless communication device, after a last acknowledgement frame has been transmitted according to the order of the sequence of frames, indicated in the announcement frame. In some implementations, transmitting, by the at least one of the number of second wireless communication devices using spatial reuse, the frame to be directed to the at least one third wireless communication device, is simultaneously with transmitting, by the first wireless communication device, one of the sequence of frames, to a respective one of the number of second wireless communication devices.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including, potentially, a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them, including potentially embedded firmware and/or controller microcode).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification, in the context of separate implementations, can also be implemented in combination, in a single implementation. Conversely, various features that are described in the context of a single implementation can also be implemented in multiple implementations separately, or in any suitable subcombination. Moreover, although features may be described above as acting in certain combinations, and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method comprising:
   obtaining, at a first wireless communication device, a connectivity map for broadcast and multicast to a plurality of second wireless communication devices before a broadcast and multicast service period, based on beamforming training information received from the plurality of second wireless communication devices; and
   transmitting, at the first wireless communication device, an extended schedule element in a management frame that notifies the plurality of second wireless communication devices the broadcast or multicast service period;
   transmitting, at the first wireless communication device, an announcement frame indicating the broadcast or multicast service period to the plurality of second wireless communication devices, wherein the announcement frame indicates (i) an end time of the broadcast or multicast service period and (ii) by an indicator in the announcement frame an order of a sequence of frames to be directed to the plurality of second wireless communication devices, each of the sequence of frames to be directed to a respective one of the plurality of second wireless communication devices, wherein the announcement frame does not solicit an acknowledgement;

transmitting, at the first wireless communication device using a directional antenna pattern, each frame of the sequence of frames to the respective one of the plurality of second wireless communication devices, according to the order of the sequence of frames indicated in the announcement frame; and receiving, at the first wireless communication device from the respective one of the plurality of second wireless communication devices, an acknowledgement frame in response to the each of the sequence of frames.

2. The method of claim 1, wherein transmitting the announcement frame comprises transmitting the announcement frame using a quasi-omni-directional antenna pattern.

3. The method of claim 1, wherein transmitting the announcement frame comprises: transmitting the announcement frame that is aggregated with data frames to the plurality of second wireless communication devices before a start of the broadcast or multicast service period.

4. The method of claim 1, wherein the announcement frame further indicates an end time of a last frame in the sequence of frames within the broadcast or multicast service period.

5. The method of claim 1, wherein receiving an acknowledgement frame in response to the each of the sequence of frames comprises receiving the acknowledgement frame in response to the each of the sequence of frames, after transmitting all of the sequence of frames to be directed to the plurality of second wireless communication devices.

6. The method of claim 1, wherein the acknowledgement frame in response to the each of the sequence of frames is one of a sequence of acknowledgement frames from the plurality of second wireless communication devices; and wherein receiving an acknowledgement frame in response to the each of the sequence of frames comprises receiving the sequence of acknowledgement frames from the plurality of second wireless communication devices, according to the order of the sequence of frames indicated in the announcement frame.

7. The method of claim 1, wherein the acknowledgement frame in response to the each of the sequence of frames is one of a sequence of acknowledgement frames from the plurality of second wireless communication devices; and the method further comprising transmitting a polling frame after transmitting the sequence of frames to trigger transmission of the sequence of acknowledgement frames from the plurality of second wireless communication devices, according to the order of the sequence of frames indicated in the announcement frame.

8. The method of claim 1, wherein two adjacent frames in the sequence of frames are separated by an inter-frame spacing time interval that is shorter than a short inter-frame space (SIFS) and the announcement frame is a different type of frame from each of the sequence of frames.

9. The method of claim 1, wherein at least each of the plurality of second wireless communication devices serves as a relay between the first wireless communication device and at least one third wireless communication device, the method further comprising:

transmitting, by the at least one of the plurality of second wireless communication devices, the frame to be directed to the at least one third wireless communication device, after a last acknowledgement frame has been transmitted, according to the order of the sequence of frames indicated in the announcement frame.

10. The method of claim 1, wherein at least each of the plurality of second wireless communication devices serves as a relay between the first wireless communication device and at least one third wireless communication device, the method further comprising:

transmitting, by the at least one of the plurality of second wireless communication devices using spatial reuse, the frame to be directed to the at least one third wireless communication device, simultaneously with transmitting, by the first wireless communication device, one of the sequence of frames to a respective one of the plurality of second wireless communication devices.

11. The method of claim 1, wherein the indicator is an index mapping to the order of the sequence of frames in a lookup table stored at the plurality of second wireless devices.

12. A device including:

a transceiver;

processor electronics coupled with the transceiver; and a non-transitory computer-readable storage medium coupled to the processor electronics and storing programming instructions for execution by the processor electronics, wherein the programming instructions instruct the processor electronics to operate the transceiver to:

receive, from a first wireless communication device, an extended schedule element in a management frame that notifies a plurality of second wireless communication devices a broadcast or multicast service period, wherein the plurality of second wireless communication notified is based on a connectivity map obtained by the first wireless communication device for broadcast and multicast to the plurality of second wireless communication devices before the broadcast and multicast service period, the connectivity map based on beamforming training information received from the plurality of second wireless communication devices;

receive, from the first wireless communication device, an announcement frame indicating the broadcast or multicast service period to the plurality of second wireless communication devices, the device being one of the plurality of second wireless communication devices, wherein the announcement frame indicates (i) an end time of the broadcast or multicast service period, (ii) an end time of a last frame in a sequence of frames within the broadcast or multicast service period, and (iii) by an indicator in the announcement frame an order of the sequence of frames to be directed to the plurality of second wireless communication devices, each frame of the sequence of frames to be directed to a respective one of the plurality of second wireless communication devices, wherein the announcement frame does not solicit an acknowledgement;

receive, from the first wireless communication device, a frame of the sequence of frames to be directed to the device, according to the order of the sequence of frames indicated in the announcement frame; and transmit, to the first wireless communication device, an acknowledgement frame in response to receiving the frame to be directed to the device, according to the order of the sequence of frames indicated in the announcement frame.

13. The device of claim 12, wherein the programming instructions instruct the processor electronics to operate the transceiver to:
  decode, from the announcement frame, an end time of a last frame in the sequence of frames within the broadcast or multicast service period; and
  transmit, to the first wireless communication device, the acknowledgement frame in response to receiving the frame to be directed to the device according to the order of the sequence of frames indicated in the announcement frame after the end time of the last frame in the sequence of frames within the broadcast or multicast service period.

14. The device of claim 12, wherein the programming instructions instruct the processor electronics to operate the transceiver to:
  receive a polling frame after receipt of the sequence of frames for triggering transmission of a sequence of acknowledgement frames from the plurality of second wireless communication devices according to the order of the sequence of frames indicated in the announcement frame; and
  transmit, to the first wireless communication device, the acknowledgement frame in response to receiving the frame to be directed to the device, according to the order of the sequence of frames indicated in the announcement frame after receiving the polling frame.

15. The device of claim 12, wherein the device serves as a relay between the first wireless communication device and at least one third wireless communication device, and the programming instructions instruct the processor electronics to operate the transceiver to:
  relay a frame to be directed to the at least one third wireless communication device.

16. The device of claim 15, wherein the programming instructions instruct the processor electronics to operate the transceiver to:
  transmit the frame to be directed to the at least one third wireless communication device, after a last acknowledgement frame has been transmitted, according to the order of the sequence of frames indicated in the announcement frame.

17. The device of claim 15, wherein the programming instructions instruct the processor electronics to operate the transceiver to:
  transmit, using spatial reuse, the frame to be directed to the at least one third wireless communication device, simultaneously with the first wireless communication device's transmission of one of the sequence of frames to a respective one of the plurality of second wireless communication devices.

18. A device comprising:
  a transceiver;
  processor electronics coupled with the transceiver; and
  a non-transitory computer-readable storage medium coupled to the processor electronics and storing programming instructions for execution by the processor electronics, wherein the programming instructions instruct the processor electronics to operate the transceiver to:
    obtain a connectivity map for broadcast and multicast to the plurality of second wireless communication devices before the broadcast and multicast service period, based on beamforming training information received from the plurality of second wireless communication devices;
    transmit an extended schedule element in a management frame that notifies the plurality of second wireless communication devices the broadcast or multicast service period;
    transmit an announcement frame indicating a broadcast or multicast service period to a plurality of second wireless communication devices, wherein the announcement frame indicates (i) an end time of the broadcast or multicast service period and (ii) by an indicator in the announcement frame an order of a sequence of frames to be directed to the plurality of second wireless communication devices, each frame of the sequence of frames to be directed to a respective one of the plurality of second wireless communication devices, wherein the announcement frame does not solicit an acknowledgement;
    transmit, using a directional antenna pattern, the each frame of the sequence of frames to the respective one of the plurality of second wireless communication devices, according to the order of the sequence of frames indicated in the announcement frame; and
    receive, from the respective one of the plurality of second wireless communication devices, an acknowledgement frame in response to the each of the sequence of frames.

19. The device of claim 18, wherein the announcement frame further indicates an end time of a last frame in the sequence of frames within the broadcast or multicast service period.

* * * * *